United States Patent
Golin et al.

(10) Patent No.: US 6,683,608 B2
(45) Date of Patent: *Jan. 27, 2004

(54) SEAMING POLYGONAL PROJECTIONS FROM SUBHEMISPHERICAL IMAGERY

(75) Inventors: Stuart J. Golin, East Windsor, NJ (US); Scott Gilbert, Tucson, AZ (US); Thomas Baker, Beaverton, OR (US)

(73) Assignee: iMove Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,418

(22) Filed: Oct. 3, 2001

(65) Prior Publication Data

US 2002/0015049 A1 Feb. 7, 2002

Related U.S. Application Data

(63) Continuation of application No. 09/460,453, filed on Dec. 13, 1999, now Pat. No. 6,320,584, which is a continuation of application No. 08/980,503, filed on Dec. 1, 1997, now Pat. No. 6,031,540, which is a continuation-in-part of application No. 08/552,299, filed on Nov. 2, 1995, now Pat. No. 5,694,531.

(51) Int. Cl.[7] .............................................. G06T 15/00
(52) U.S. Cl. ...................................................... 345/419
(58) Field of Search ............................... 345/419, 420, 345/422, 427, 428, 619, 629

(56) References Cited

U.S. PATENT DOCUMENTS

| | | | |
|---|---|---|---|
| 4,463,380 A | 7/1984 | Hooks, Jr. ................... | 358/160 |
| 4,807,158 A | 2/1989 | Blanton et al. ............. | 358/160 |
| 5,023,725 A | 6/1991 | McCutchen ................. | 358/231 |
| 5,040,081 A | 8/1991 | McCutchen ................. | 360/133 |
| 5,103,217 A | 4/1992 | Cawley ....................... | 395/129 |
| 5,185,667 A | 2/1993 | Zimmermann ............... | 369/522 |
| 5,313,306 A | 5/1994 | Kuban et al. ................ | 345/114 |
| 5,359,363 A | 10/1994 | Kuban et al. ................ | 364/518 |
| 5,384,588 A | 1/1995 | Martin et al. ................ | 358/160 |
| 5,396,583 A | 3/1995 | Chen et al. .................. | 364/522 |
| 5,446,833 A | 8/1995 | Miller et al. ................. | 395/125 |
| 5,694,531 A * | 12/1997 | Golin et al. ................. | 345/419 |
| 5,703,604 A | 12/1997 | McCutchen ................... | 345/8 |
| 6,031,540 A * | 2/2000 | Golin et al. ................. | 345/419 |
| 6,320,584 B1 * | 11/2001 | Golin et al. ................. | 345/435 |

FOREIGN PATENT DOCUMENTS

| | | |
|---|---|---|
| EP | 91201413.1 | 7/1991 |
| EP | 522204 | 1/1993 |

OTHER PUBLICATIONS

Foley J.D., van Dam A., Feiner, S.K., Hughes, J.F., Computer Graphics: principles and practice, 2nd ed., Addison-h–Wesley, 1987, pp. 3–7.

(List continued on next page.)

Primary Examiner—Phu K. Nguyen
(74) Attorney, Agent, or Firm—Fenwick & West LLP

(57) ABSTRACT

A method and apparatus for generating views of an environment with proper perspective and parallax. This invention captures panoramic views at many points in the environment, preferably by using fisheye lenses with subhemispherical fields of views to yield overlapping fisheye images that are seemed together, and stores them as planar polygons, which have been extended to include imagery occluded at their viewing position but visible at nearby points. Three-dimensional information on the environmental source of these polygons is determined and stored, enabling the playback system to simulate parallax as well as to produce stereographic images. Given a location and orientation in the environment, the playback system finds a nearby capture point and translates the polygons at that point to the specified location, producing an image. It then rotates that image to the desired orientation which it then displays.

17 Claims, 5 Drawing Sheets

OTHER PUBLICATIONS

Smith "Planar 2–Pass Texture Mapping and Warping" *Computer Graphics*, Jul. 1987, pp. 263–272.

Shenchang Eric Chen, Lance Williams, Apple Computer, Inc., "View Interpolation for Image Synthesis," *Computer Graphics Proceedings, Annual Conference Series, 1993*, pp. 279–288.

Leonar McMillan and Gary Bishop, "Plenoptic Modeling: An Image–Based Rendering System," *Computer Graphics Proceedings, Annual Conference Series, 1995*, pp. 39–46.

\* cited by examiner

SEAMING POLYGONAL PROJECTIONS FROM SUBHEMISPHERICAL IMAGERY

This application is a continuation of U.S. Application Ser. No. 09/460,453, filed Dec. 13, 1999, (now U.S. Pat. No. 6,320,584), which is a continuation of Application Ser. No. 08/980,503, filed Dec. 1, 1997 (now U.S. Pat. No. 6,031,540), which is a continuation-in-part of U.S. Application Ser. No. 08/552,299, filed Nov. 2, 1995 (now U.S. Pat. No. 5,694,531).

BACKGROUND OF THE INVENTION

1. Field of the Invention

This invention relates generally to digital image processing and computer graphics. More particularly, it is concerned with generating full-sphere panorama views using subhemispherical images and simulating free movement within a multidimensional environment, which can be either computer-generated or real.

2. Description of the Related Art

Computer-generated (CG) environments are typically created by representing objects with polygons and associated computer-generated or photographic surfaces, or texture maps. Rendering, the construction of an image from a CG model, can be done from any point of view. See Foley [J. D. Foley, A. van Dam, S. K. Feiner, J. F. Hughes, *Computer Graphics: principles and practice,* 2nd ed., Addison-Wesley, 1987]. As such, it provides unrestricted simulated movement within the environment. However, the temporal resolution of unrestricted movement within a realistic CG environment that one can achieve on today's personal computers is severely limited by the computational requirements and by the labor of constructing realistic imagery.

U.S. Pat. No. 4,807,158 to Blanton, et. al discloses a method for reducing the computational requirements of rendering CG images, which could also be applied to natural images. First they build a database of images at selected positions, or "keypoints", within the environment by rendering them in an off-line process. They store these panoramic images as conic projections. Then in real time, the application approximates the image at any position from that at the nearest keypoint. This approach works well when all objects are about the same distance from the viewer. This is a good assumption in their application, a flight simulator, but the loss of parallax would be a severe limitation in many environments. Objects at different distances move as a unit within the domain of a keypoint, and parallax is only evident when the keypoint changes.

U.S. Pat. No. 5,396,583 to Chen, et. al captures panoramas and project them onto cylindrical surfaces for storage. They are able to rapidly project images from a cylinder to a plane using "scanline coherence". Unfortunately, like Blanton, their method does not support parallax.

McMillan, et. al. [L. McMillan and G. Bishop, *Plenoptic Modeling: An Image-Based Rendering System,* Siggraph '95 Proceedings, 1995], report a method that supports parallax, and apply it to natural images. They also produce a series of reference images off-line, which are captured with a video camera and re-projected to cylinders for storage. To support parallax, they calculate the image flow field between adjacent reference images. Now, when an image is approximated from a nearby reference image, different parts will move differently. Unfortunately, artifacts are quite apparent unless the image flow field is extremely accurate. Occluded regions cause additional artifacts.

The cylindrical surface (Chen and McMillan) is very inefficient for storing panoramic imagery near the vertical. Other panorama projections do not suffer from the limitations of the cylindrical projection. These include spherical, fisheye and cubic representations.

U.S. Pat. No. 5,185,667 to Zimmerman discloses a system for translating a selected portion of a hemispherical fisheye image into a planar projection for display on a CRT. The Zimmerman reference does not disclose how such hemispherical images can be seemed together by edge-to-edge abutment to form a 360 degree panoramic image. Additionally, such hemispherical fisheye images have been found to include several drawbacks that degrade the quality of the resulting translated image portion.

Accordingly, the need remains for providing improved panoramic imagry for simulating free movement within a multidimensional environment.

SUMMARY OF THE INVENTION

It is the object of this invention to simulate movement in a multidimensional space by approximating views at any viewpoint and orientation, with correct perspective and parallax. An additional object of this invention is to support stereography. It is a further object of this invention to provide an efficient method for storing panoramic imagery, especially for orientations near the vertical.

This invention captures panoramic views at many keypoints in the environment, preferably using fisheye photography. It stores these views as projections, from which one can produce views at any position and orientation. The fisheye photography can come from a variety of different lenses including those which have a maximum view angle that is less than, or greater than, 180 degrees. Most preferably, however, a fisheye lens having a view angle of less than 180 is used to avoid the drawbacks of 180 degree or greater fisheye lenses. For instance, several 150 degree images can be taken, overlapped, and seemed together using such tools as the Smoothmove™ seamer from Infinite Pictures, Inc. to form a full panoramic image.

An example of such seaming technique is disclosed herein. Digitized fisheye images are taken in several predefined directions, depending upon the configuration of the lens, to capture the entire image sphere. For instance, in a "bipyramidal" configuration consisting of five fisheye images, a fisheye lens having a view angle of at least approximately 127 degrees is used at 0°, 120° and 240° around the horizontal, straight up, and straight down to define the image sphere.

These images are then mapped to a panoramic image. The subhemispherical imagry form overlapping views defining identical imagery in real space. The overlapping pixels defining these portions of real space come from more than one fisheye image. The color and brightness values of the pixel at a particular real space location are a weighted average of such values from overlapping pixels based upon the area of overlap. These overlapped images can then be converted to equirectangular format in an offline intermediate step before ultimately perspectively correcting the view in real time.

In the preferred embodiment, the projections are planar, and consist of polygons that are projections of areas in the environment that are approximately planar. The locations of these areas are stored, giving the playback system the three-dimensional information necessary to infer how the individual polygons move with the viewpoint, and thus simulate parallax.

Because it simulates parallax, the invention can produce stereographic images.

The preferred embodiment solves the occlusion problem in a novel way. Imagery that is occluded at a keypoint but visible at a nearby viewpoint is added to that keypoint, either by extending existing polygons or by creating new ones.

DETAILED DESCRIPTION OF THE INVENTION

Figure 1:
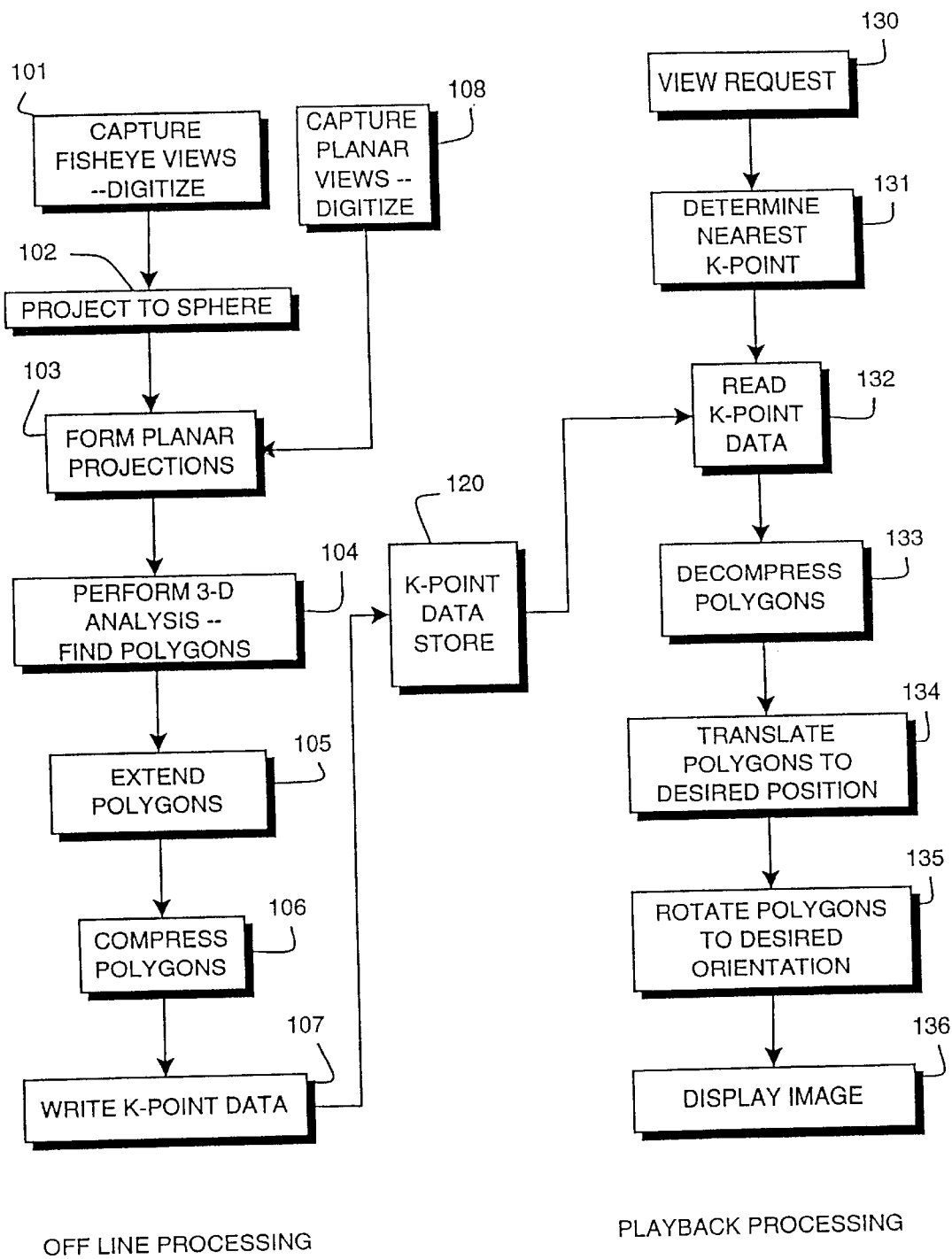
FIG. 1 is a flow chart illustrating an overview of the invention.

FIG. 1 shows the overall operation of the invention. Images are captured either by a fisheye 101 or planar camera 108, and are used to form planar projections 103 at key-points; fisheye images are first projected to a sphere 102. An analysis 104 is performed to segment these images into polygons that are the projections of approximately planar areas in the environment. These polygons are extended 105 with occluded imagery and then compressed 106. The compressed polygons, together with three-dimensional and other information, are written 107 to computer-readable storage 120.

The playback system, on receiving a view request 130 specifying a position and orientation in the environment, determines the nearest keypoint 131 and reads 132 the relevant data from storage 120. It decompresses 133 the polygons at that keypoint, translates 134 them to the desired position, rotates 135 them to the desired orientation, and displays 136 the resulting image.

Figure 2:
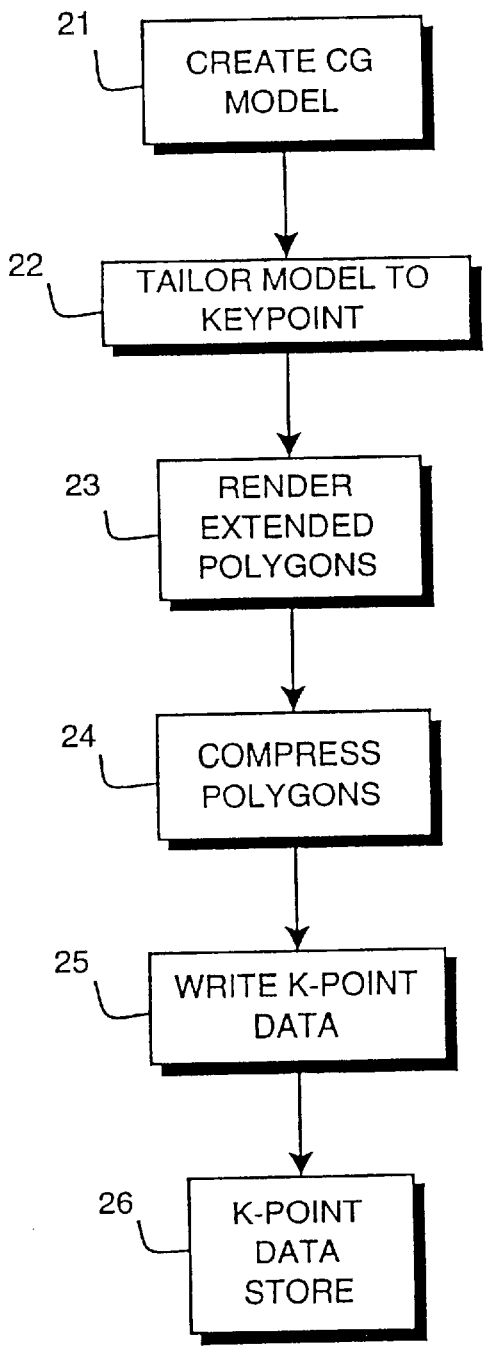
FIG. 2 is a flow chart illustrating an overview of the off-line processing of the invention for a CG model that takes advantage of access to that model.

CG environments can be handled exactly as in FIG. 1, except that the views are rendered from the model rather than being captured. However, if one has access to the internals of the model, then one can simplify the analysis, and even eliminate off-line processing. FIG. 2 shows the off-line processing that takes advantage of the model. After the model is created 21, this processing tailors the model 22 for the keypoint by eliminating detail that is too fine to be realized at that keypoint. It then extends and renders 23 and compresses 24 the polygons, and writes the k-point data 25 to computer-readable storage 26.

Figure 3:
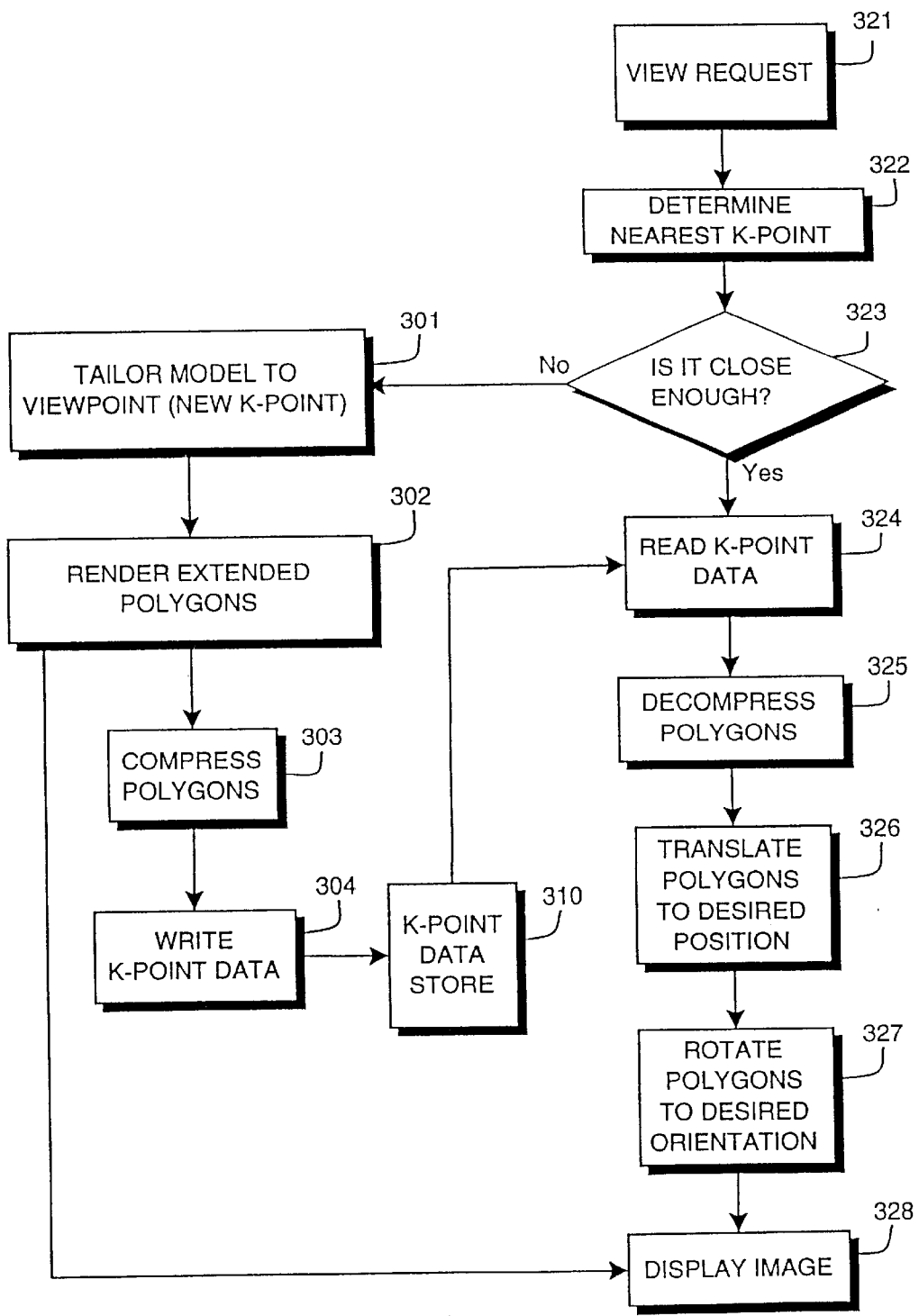
FIG. 3 is a flow chart illustrating how the invention can be used to eliminate off-line processing for a CG model.

FIG. 3 shows a self-contained playback system, one that does not require off-line processing. It is similar to the playback system in FIG. 1, except that it generates keypoint data as needed. It does this using the methods illustrated in FIG. 2. In particular, on receiving a view request 321, it determines the nearest k-point 322. If this k-point is close enough 323 to the viewpoint, it reads the k-point data 324 from computer-readable storage 310, decompresses the polygons 325, translates the polygons to the desired position 326, rotates them to the desired orientation 327, and displays the resulting image 328. If it is determined 323 that no k-point is sufficiently close to the viewpoint, then the CG model is tailored to the viewpoint 301, to make it a new k-point. It then extends and renders the polygons 302, compresses them 303, and writes the k-point data 304 to computer-readable storage 310.

Figure 4:
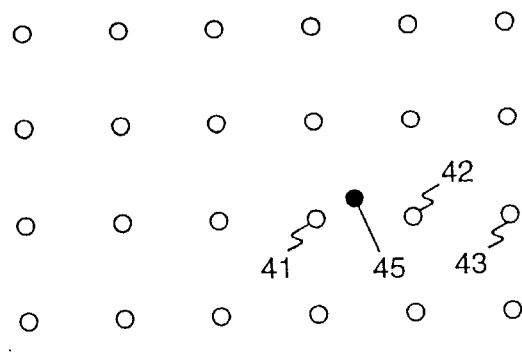
FIG. 4 shows a two dimensional arrangement of key-points (open circles) with a potential viewpoint (closed circle).

FIG. 4 shows a possible two-dimensional environment with open circles 41, 42, 43 representing keypoints, and a closed circle 45 representing a viewpoint. The view at the viewpoint 45 is preferably based on that of the nearest keypoint 41.

The invention consists of the panoramic database, its creation, and its use to map images to arbitrary positions and orientations.

A. Notation

CG, or Computer Graphics, refers to artificial environments.

A projection of the environment is specified by an orientation, or axis of projection, a projection surface normal to that axis, and by the center of projection. The center of projection, or point of view, is the viewpoint; it corresponds to the nodal point of a camera. Unless otherwise specified, the projection surface is planar. Other possibilities include cylindrical, conic, spherical, and fisheye projections. The distance from the center of projection to the plane of projection is the focal length, and is measured in pixels.

Polygons, unless otherwise qualified, are projections of approximately planar areas of the environment. These planar approximations are also polygonal, and are called e-polygons (e is for environment). The e-polygons form a "wire-frame model", and the polygons form the "texture maps". In contrast to conventional CG modeling, however, the environment description is redundant, with multiple e-polygons and polygons instead of one.

Images are projections that are large enough to fill a display. Images may be segmented into polygons.

Projections may be produced directly from the environment or from a CG model, or they may be approximated from previously calculated k-projections (key projections) by a mapping process. The viewpoints of the k-projections are called k-points (keypoints). A k-polygon is a k-projection that is a polygon, and a k-image is a k-projection that is an image. We will sometimes omit the "k-" prefix when the context makes it obvious.

The domain of a k-point is the range of viewpoints and orientations to which its projections can be mapped. The domain of a k-projection is that of its k-point. K-polygons with occluded areas may be extended to support their domains. The domain of a k-point is supported when its k-polygons contain all of the imagery needed to map to any viewpoint in that domain.

Domains can overlap. Non-overlapping domains of k-points can be constructed as Voronoi regions, also known as Dirichlet and nearest neighbor regions, or in other ways.

The mapper produces an image that can be displayed, and is part of the playback system.

B. Description of the Panoramic Database

The database, which is in a computer-readable storage medium, consists of a set of k-projections, together with their k-points, predetermined key orientations, domains, and other information useful for the creation of views of the environment. All of the data associated with a k-point is collectively referred to as k-point data. The k-projections may be uncompressed, or may be compressed with any of a variety of techniques, such as MPEG or JPEG. For CG environments, the k-projections that are rendered at a k-point might be compressed using a graphic representation. (This is less compression than one could achieve by simply storing the original CG model, but it leads to faster playback.)

The k-points may be arranged on a two or three dimensional lattice, may be concentrated in areas of high detail, or may follow some other arrangement.

In the preferred embodiment, the projections are all planar. However, alternate embodiments use cylindrical, conic, spherical, or fisheye projections. One embodiment uses a cylindrical projection for the "equatorial" region and conic projections for the "poles"; the mathematics for these projections is described by Blanton and McMillan.

There are many different ways to store the k-projections as planar projections at a k-point. In the preferred embodiment, one stores a large number of k-polygons at various orientations. In an alternate embodiment, one stores one or more k-images at various orientations. The way this is done will depend on the needs of the application, such as the importance of the "polar regions". As few as four k-images, arranged tetrahedrally, provide a full panorama. However, the more k-images, the fewer the total number of pixels. An obvious arrangement consists of six k-images around the equator (horizon), three to six k-images about 60° above the equator, and three to six below. Another possibility is four k-images about 45° above the equator, and four below.

There is a useful advantage in storing the panorama as planar images, as opposed to, say, cylindrical ones: the images at the k-points can be directly displayed without mapping. When one moves rapidly through the environment, it may be sufficient to display an existing image that has approximately the correct viewpoint and orientation. This benefit is somewhat reduced when the k-projections are similarly oriented polygons rather than images, and reduced more if their orientations are independent.

When the k-projections are stored as k-images, then these images are completely segmented into non-overlapping polygons. Whether the polygons are stored as units or as subunits of an image, each polygon represents the projection of an area of the environment that is approximately planar. The planar approximation of this area is also polygonal, and is known as an e-polygon. The database records the planar equation of each e-polygon. (Alternately, one can specify the coordinates of its vertices, or calculate them from the planar equation, the coordinates of the vertices of the k-polygon, and Eq. 5 and Eq. 10 below.) This permits the mapper to translate the polygon to another viewpoint in its domain.

It is desirable for storage and computational efficiency that the k-polygons and their corresponding e-polygons be large and few in number. However, the larger they are, the worse the planar approximation becomes, and the larger will be the parallax distortion when a polygon is mapped to a viewpoint in its domain. This distortion limits their sizes. This implies that an area of the environment represented by a single e-polygon (and a single k-polygon) at a distant k-point will likely be represented by multiple e-polygons at one nearby.

The e-polygons form a three-dimensional model for a k-point and its domain. In the preferred embodiment only one k-polygon is stored for each e-polygon. The k-polygon can be formed as a projection of the e-polygon at any orientation; a convenient orientation is the one pointing to the center of gravity of the e-polygon. In an alternate embodiment, an e-polygon is represented by k-polygons at several orientations to minimize the magnitude of the scale changes and shearing of a mapping, and thus to minimize aliasing.

In the preferred embodiment, the polygons of a k-point are extended to include parts of the environment that are occluded at that k-point but are visible at some point in their domain. (The k-projections cannot be stored as k-images in this embodiment because the extended polygons would overlap if placed in a single plane.) Without this embodiment, the mapper must use k-projections at more than one k-point to map the occluded areas.

In an alternate embodiment, the k-polygons are replaced by curved areas that more naturally represent the environment.

To minimize the complexity of mapping, the polygons (or curved areas) at each k-point are described in "list-priority" order. They are split as necessary to preserve this order over their domain, as described by Foley in chapter 15.

C. Preparation of the Panoramic Database for CG Environments

One can calculate the k-projections for CG environments using the standard graphics rendering techniques described by Foley. However, clipping will be disabled, or at least relaxed, in order to extend the polygons to support their domain. Similarly, the e-polygons follow directly from the CG model. This assumes that the embodiment of the invention has access to the CG model, and that it can control the rendering of that model. Otherwise, some of the techniques described below for natural environments will be needed here.

CG models tend to use a large number of e-polygons. These e-polygons are important for mapping images at nearby viewpoints, but their numbers are excessive for distant viewpoints. For those viewpoints, it is necessary to consolidate e-polygons; a good criterion is to consolidate when the resulting parallax error is below a predetermined limit, preferably 1 pixel. However, merging continues at least until the number of e-polygons is reduced to a predetermined limit.

In the preferred embodiment the database is built off-line, as shown if FIG. 2. In an alternate embodiment, projections are rendered from the CG model as needed, as shown if FIG. 3. The viewer-selected viewpoints, or a subset of them, become k-points. This alternate embodiment reduces bandwidth and/or storage requirements, and is important when it is not practical to pre-calculate the database, or to transmit it dynamically. Suppose, for example, a game player enters a new environment. Because some delay can be expected in this case, it may be acceptable to render the first several projections dynamically. These projections and associated information are saved as k-point data. As the number of k-points increases, it will become increasingly likely that one can map k-projections from existing ones, and response will improve.

D. Preparation of the Panoramic Database for Natural Environments

1. Construction of k-Projections

There are various ways to construct panoramic views. One embodiment combines the projections from a video camera (McMillan). The preferred embodiment uses a camera with a fisbeye lens. A single fisheye camera, pointed forward, will capture about half of the panorama at a k-point, which will be adequate for some applications, and two may provide a full panorama. The preferred embodiment uses three horizontal fisheye projections with 120° between their axes, which provide a full panorama with ample overlap to minimize boundary artifacts. An alternate embodiment uses a single fisheye projection pointed upward; a 220° lens can capture everything except for imagery about 20° or more below the horizon.

Conceptually, one produces planar projections from the fisheye image by using a spherical projection as an intermediary. The mapping to a sphere can be understood from FIG. 5, which represents both the fisheye image and the sphere, with slightly different interpretations. Subscripts will distinguish these cases: f for the fisheye and s for the sphere. The point to be mapped, p, is represented by h, its distance to the origin, O, and θ, the angle from the vertical. H is the maximum value of h.

$H_f$ is the radius of the fisheye image. The units of $h_f$ and $H_f$ are pixels.

Figure 5:
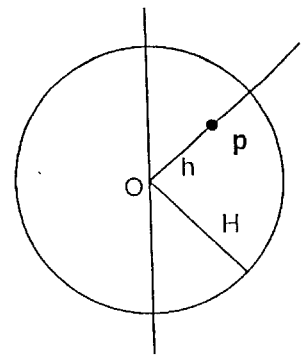
FIG. 5 represents both a fisheye projection and a spherical projection of that fisheye projection.

For the sphere, the view in FIG. 5 is along the axis of the camera, with the viewpoint, or center of projection, at the center of the sphere. The origin, $O_s$, is at the intersection of the axis and the surface of the sphere; it is NOT the center of the sphere. $h_s$ is the angle of the arc of the great circle between $O_s$ and $p_s$, and $H_s$ is the maximum angle of view, measured from $O_s$. For example, for a 180° lens, $H_s=90°=\pi/2$. $\theta_s$ is the dihedral angle between 2 axial planes, one through the vertical and one through $p_s$.

A preferred method for obtaining a fisheye image is to use a fisheye lens which has a maximum viewing angle that is "subhemispherical", e.g. less than 180 degrees. For instance, one could use a fisheye lens with a maximum view angle of 150 degrees to capture several images by aiming the camera around the horizon and then aiming it up and down. These pictures could then be used to construct a full panorama representing the entire spherical view. The mathematics are the same as in the case of a traditional 180 degree fisheye.

Figure 9:
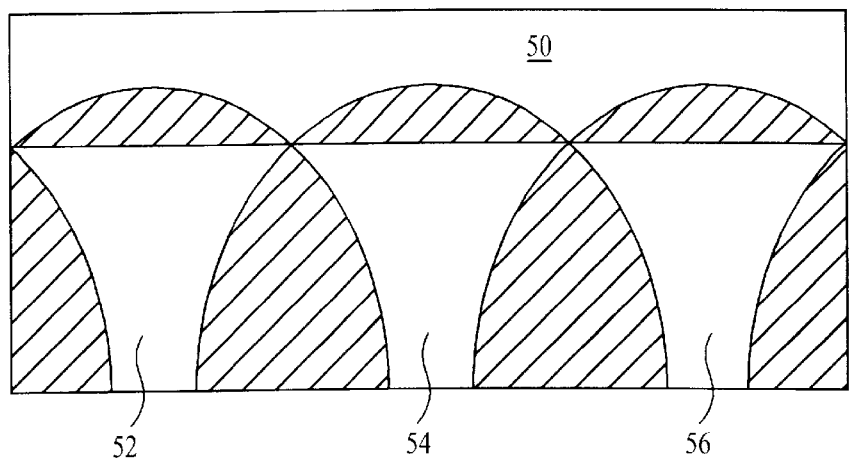
FIG. 9 is an equirectangular projection of fisheye images taken in a tetrahedral configuration.

To capture a full spherical image, several methods are envisioned using subhemispherical views. FIG. 9 illustrates an equirectangular projection of fisheye images in a tetrahedral configuration. Each fisheye image has a view angle of at least approximately 142°. All overlapping portions of the projection are shown in cross-hatching. Shown in FIG. 9 are four images 50, 52, 54 and 56. To gain full coverage of the image sphere, image 50 is taken straight upward from a keypoint and remaining images 52, 54 and 56 are taken at 0°, 120° and 240° around a vertical axis and in a direction tilted downward by about 19.5° below horizontal.

Figure 10:
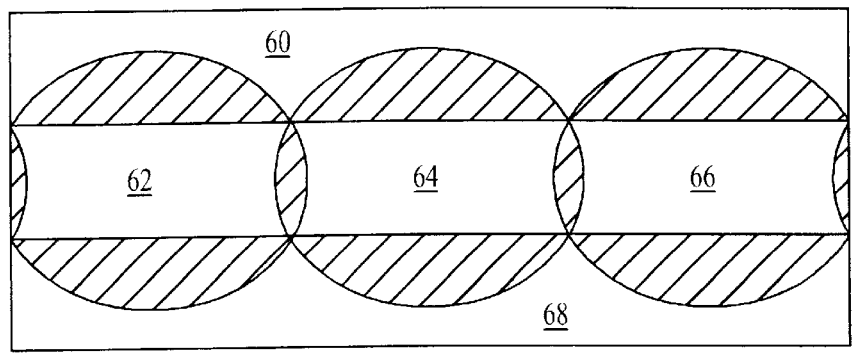
FIG. 10 is an equirectangular projection of fisheye images taken in a bipyramidal configuration.

FIG. 10 illustrates an equirectangular projection of fisheye images in a bipyramidal configuration consisting of five fisheye images 60, 62, 64, 66 and 68. Each fisheye image of the bipyramidal configuration has a view angle of at least approximately 127°. To gain full coverage of the image sphere, image 60 is taken straight upward and image 68 is taken straight downward from a keypoint. The remaining images 62, 64 and 66 are taken at 0°, 120° and 240° around a vertical axis.

Figure 11:
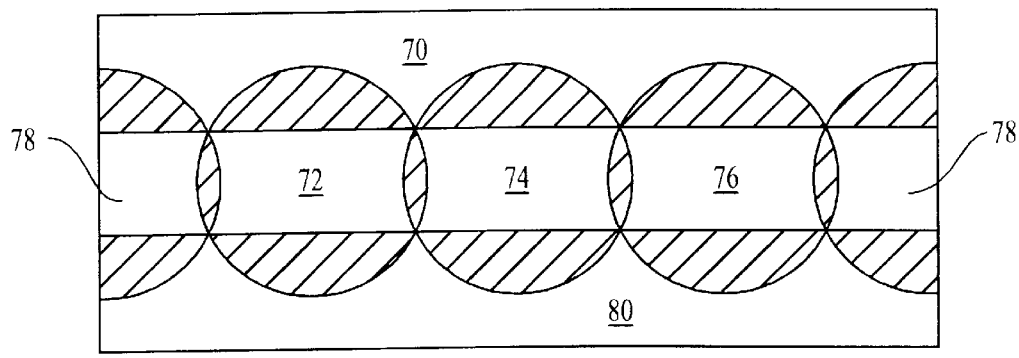
FIG. 11 is an equirectangular projection of fisheye images taken in a cubic configuration.

FIG. 11 illustrates an equirectangular projection of fisheye images in a cubic configuration consisting of six fisheye images 70, 72, 74, 76, 78 and 80. Each fisheye image of the cubic configuration has a view angle of at least approximately 109.5°. To gain full coverage of the image sphere, image 70 is taken straight upward and image 80 is taken straight downward from a keypoint. The remaining images 72, 74, 76 and 78 are taken at 0°, 90°, 180°, and 270° (or East, North, West and South) about a vertical axis.

seaming of subhemispherical views to obtain a panoramic image is preferred because of inherent optical drawbacks with 180° or greater images. For instance, lower quality 8 mm fisheye lenses tend to have extreme circular fisheye distortion near the edges of the image. Furthermore, more information needs to be packed into the same image frame. These two factors combined have been found to produce low quality panoramas.

Other drawbacks of 180° or greater fisheye photography is the general requirement of manual touchup of images to eliminate such artifacts as a capture of the tripod supporting the camera. Additionally, lens glare is common in 180° or greater fisheye images because direct light is difficult to avoid. The 180° field of view also tends to cover very wide dynamic ranges of lighting, especially in interior shots, and produce highly contrasted pictures. Finally, panoramas created with 180° fisheye lenses devote a lot of pixels to the top and the bottom regions of the image which tend to have little information while the compressed middle region tend to have more details. To achieve similar quality for displaying information in the middle region, the panorama size will need to be much bigger (about 2× or more). This results in bigger file sizes for any computer downloads.

The mapping to the sphere is simply (see, e.g., R. Kingslake, *Optical System Design*, p. 87, Academic Press, 1983, for a discussion of the fisheye):

$$\theta_s = \theta_f$$

$$h_s/H_s = h_f/H_f \qquad \text{Eq. (1)}$$

Figure 6:
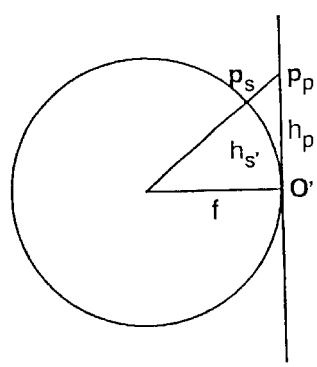
FIG. 6 illustrates the projection from a sphere to a plane.

One can readily project from a sphere to a plane at any orientation. FIG. 6 shows a plane in cross section tangent to the sphere at point O', which specified the orientation. For any point in the plane, one finds the corresponding point in the sphere by extending the radial line from the sphere to the plane. Then, with $f$ being the focal length and $(h_p, \theta_p)$ being the polar coordinates of a point in the plane (see FIG. 5), the point on the sphere is:

$$h_s' = \tan^{-1}(h_p/f)$$

$$\theta_s' = \theta_p \qquad \text{Eq. (2)}$$

Figure 7:
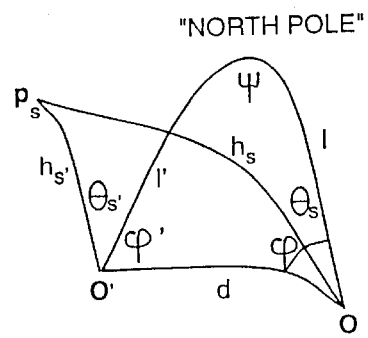
FIG. 7 shows the relevant parameters in converting origins of a sphere.

It is desirable to express this in terms of $(h_s, \theta_s)$ so that Eq. 1 can be used to get the fisheye coordinates. FIG. 7 shows the quantities used to express the conversion, where all of the curves are arcs of great circles, and the lengths are measured as angles. The "North Pole" defines the vertical, and 1 and 1' are the compliments of the "latitudes" of O and O', respectively. φ is the azimuth angle between O and O'.

From 1, 1', and φ, which are independent of p and are assumed known, we find the intermediate quantities: ϕ, and ϕ', from spherical trigonometry:

$$\cos d = \cos 1' + \sin 1 \sin 1' \cos \phi$$

$$\sin \phi'/\sin 1 = \sin \phi/\sin 1' = \sin \phi/\sin d \qquad \text{Eq. (3)}$$

Then:

$$\cos h_s = \cos h_s' \cos d + \sin h_s' \sin d \cos(\phi + \theta_s')$$

$$\sin(\phi - \theta_s) = \sin(\phi' + \theta_s')\sin h_s'/\sin h_s \qquad \text{Eq. (4)}$$

Note when $h_s=0$, that $\theta_s$ is irrelevant.

Of course, the entire panorama requires more than one fisheye, and each fisheye will have its own origin, O. Typically one will select the O closest to the tangent point, O'.

2. Analyzing Images to Find the k-Polygons and e-Polygons

The analysis is more difficult for natural environments. The analysis, which is individually optimized for each k-point, determines the three-dimensional environment in sufficient detail to accurately map k-projections from the k-point to viewpoints in its domain. The three-dimensional environment is specified by specifying the e-polygons and their corresponding k-polygons. Since the three-dimensional environment determines how the k-polygons move with the viewpoint, one can determine the e-polygons, which approximate this environment, by observing this motion.

In the preferred embodiment the analysis uses k-images, and one selects a *target* image for each *reference* image being analyzed. The target and reference images will be assumed to have the same orientation, and will be associated with nearby k-points. Normally, the nearby k-point will be an adjacent one; however, occlusion or other reasons may reduce the value of the adjacent k-points, forcing the use of other ones. In FIG. 4, 42 is a k-point adjacent to k-point 41, and 43 is a nearby k-point that is not adjacent to 41.

One then segments the reference image into (non-degenerate) polygons that are the projections of approximately planar areas in the environment. This segmentation can be done manually using human understanding of the environment. Alternatively, one can base it on a three-dimensional model of the environment, which could be built using a commercially-available three-dimensional modeling package. One would then have to consolidate polygons, as with CG environments above.

Each polygon in the reference image is registered with the target image, and the registration is fitted to a planar model. The following describes this analysis.

First we need to know how a point in the environment projects to the two k-points. In particular, we need to know how the two image points are related. The coordinate system has x and y in the image plane and z perpendicular to it. Then:

O=origin of the reference image; i.e., its k-point.

O=origin of the target image

Figure 8:
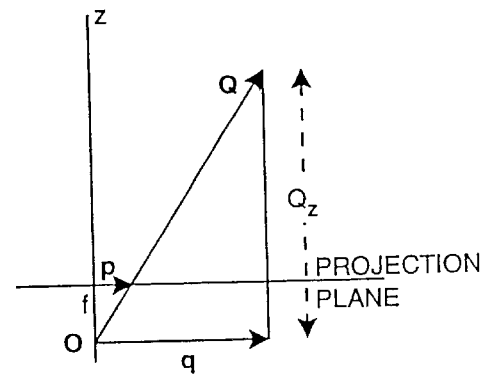
FIG. 8 illustrates the projection of an object point to a plane.

M=O'−O=the displacement between the k-points m=($M_x$, $M_y$, 0)=components of M in the plane of projection Q=object point in the o coordinate system q=($Q_x$, $Q_y$, 0)=components of Q in the plane of projection p=image point of Q in the reference image where boldface indicates a vector or point in two or three dimensions, and quantities with a prime refer to the target image. Then (see FIG. 8):

$$p/f = q/Q_z \quad \text{Eq. (5)}$$

and similarly $$p'/f = q'/Q'_z \quad \text{Eq. (6)}$$

Also, from the definition of M, it follows:

$$Q' = Q - M \quad \text{Eq. (7)}$$

From these equations, it follows:

$$p' = p + (M_z p - fm)/(Q_z - M_z) \quad \text{Eq. (8)}$$

It is useful to rewrite this as:

$$1/Q_z = (p' - p)/(M_z p' - fm) \quad \text{Eq. (9)}$$

The vector division in Eq. 9 implies that the numerator and denominator must be parallel, which is guaranteed by Eq. 8.

For Q in an e-polygon, which is assumed planar, we can write:

$$aQ_x + bQ_y + cQ_z = 1 \quad \text{Eq. (10)}$$

This equation explicitly constrains the constant term to be non-zero. When zero, the plane of the e-polygon passes through O, and the e-polygon projects as a line, or degenerate polygon, contradicting the segmentation. It follows that $1/Q_z$ is linear in p:

$$1/Q_z = aQ_x/Q_z + bQ_y/Q_z + c = ap_x/f + bp_y/f + c \quad \text{Eq. (11)}$$

using Eq. 5. Combining Eq. 9 and Eq. 11:

$$ap_x/f + bp_y/f + c = (p' - p)/(M_z p' - fm) \quad \text{Eq. (12)}$$

The next step is to determine p' as a function of p over the polygon. There are various ways of doing this. In the preferred embodiment, the polygon is broken into 8×8 blocks, and each block is compared with the target to find the best match; e.g., the minimum mean-square-difference. This is a well-known registration procedure in image coding and analysis. The possible values of p' are subject to epipolar constraints; in particular, the direction of p'-p is fixed by Eq. 8.

Eq. 12 is a system of linear equations in a, b, and c. If p' is known for at least four points in the polygon, this system is over-determined, and one can readily find the least-squares solution using standard techniques in linear algebra.

In the preferred embodiment, weighting is first applied to these points to reflect our confidence in them. One possibility is weight=<quality of fit>*<reliability of fit>

<quality of fit>=activity/(RMSE+noise)

<reliability of fit>=<useful edge strength>    Eq. (13)

A quality fit has low RMSE (root-mean-square-error) *relative* to what is possible; for various reasons, one cannot expect a very low RMSE for a very "active" block, even with a very good vector. Activity measures the roughness of the block.

Furthermore, one cannot find a reliable fit for a block without any structure. If there is a strong edge, then the component of the vector p'-p normal to direction of the edge will be reliable, but the parallel component may not be. Since the direction of this vector is determined by the epipolar constraint (Eq. 8), the *useful edge strength* is the component of the edge direction normal to the constrained direction.

3. Extending the Polygons

The polygon is then extended to support the viewpoints in its domain. This is done by: finding imagery that is not visible at the k-point because of occlusion, but that is visible at some viewpoint in the domain;

finding a nearby k-point at which that imagery is visible; and mapping that imagery from said nearby k-point to said k-point.

In the preferred embodiment, one analyzes the relative motion of adjacent k-polygons by using Eq. 8 to examine pixels along their common border. If the polygons separate for any vector M, occlusion results, and the k-polygon corresponding to the more distant e-polygon must be extended. This can be done by mapping imagery to it from a k-point in the M direction. If that k-point does not have the occluded imagery, then it will be necessary to find a nearby k-point that does. The amount the k-point must be extended depends on the extent of the domain in the M direction. In some cases, an additional k-polygon must be created to support the occluded area.

In the embodiment that stores the polygons without extension, the extension is done dynamically as needed. This is the case when the k-projections are stored as k-images.

(a) Mapping Images to Viewpoints

There are several steps in mapping an image at a viewpoint and orientation:

Select the appropriate k-point.

Translate the projections at that k-point to the viewpoint.

Rotate the orientations of the projections to the desired orientation.

Rotation and translation can be done be done in either order. If it is likely that the viewer will stay at one location for a while and look around, it is most efficient to translate first, to avoid repeating the translation. Otherwise, if the application supports stereographic images, rotation should probably be done first. The two stereographic images will have the same orientation but slightly different translations.

Of course, rotation and translation can be done at the same time.

The polygons are mapped in list-priority order, with the most distant one mapped first. Then the mapper needs not determine which pixels will actually be displayed. Alternatively, the polygons could be mapped in reverse order, with the mapper taking care not to overwrite previously mapped pixels. The extra logic prevents any pixel from being mapped more than once.

This order is obviously only important when the polygons are combined into an image. If all of the polygons have the same orientation, it is desirable to combine then in the translation phase. Otherwise, they should be combined in the second phase.

(i) K-projection Selection

The domain of the k-point must contain the viewpoint. If domains overlap, the mapper will normally select the nearest one. However, if the mapper has adequate resources, it may map the image more than once and calculate a weighed average. This will reduce the discontinuity when the viewpoint moves between domains.

For the embodiment in which k-projections are k-images, it is likely that the domain of a k-image at a k-point will not cover the entire image at the viewpoint, and that k-images with different orientations will be required.

For the embodiment in which an e-polygon at a k-point is represented by multiple polygons at various orientations, the closest orientation will be preferable. However, the mapper can map more than once and average.

(ii) Translation

Translation requires the use of polygons to achieve correct parallax. The mapping of any point, p, in a k-polygon to p' at the viewpoint is given by Eq. 8. M and m now refer to the displacement to the viewpoint, and $Q_z$ is given by Eq. 11. When necessary to reduce computation, the mapper will first consolidate polygons into larger ones.

In the preferred embodiment, Eq. 8 and Eq. 11 are only used to translate the k-polygon's vertices to the viewpoint. Then for each pixel at that viewpoint, p', the corresponding source pixel, p, is found from the inverses of these equations:

$$p = p' - (M_z p' - fm)/(Q_z' + M_z) \quad \text{Eq. (14)}$$

$$1/Q_z' = a' p_x'/f + b' p_y'/f + c' \quad \text{Eq. (15)}$$

where:

$a' = a/k$ $b' = b/k$ $c' = c/k$ $k = 1 - aM_x - bM_y - cM_z \quad \text{Eq. (16)}$ (iii) Rotation of Orientation If the orientation at a viewpoint changes, then the projection will change. This orientation change can be represented as a rotation of the coordinate system. As is well known, the corresponding change in the planar projection can be readily expressed in homogeneous coordinates (Foley, McMillan). If R is the rotation matrix that changes the coordinates of an object point Q to Q': Q'=R Q, then using Eq. 5:

$$(Q_x', Q_y', Q_z')^T = R(Q_x, Q_y, Q_z)^T = Q_z R(Q_x/Q_z, Q_y/Q_z, 1)^T = Q_z R(p_x/f, p_y/f, 1)^T$$

so that:

$$R(p_x/f, p_y/f, 1)^T = (Q_x', Q_y', Q_z')^T/Q_z = (Q_x'/q_z, Q_y'/Q_z', 1)^T Q_z'/Q_z = (p_x'/f, p_y'/f, 1)^T w \quad \text{Eq. (17)}$$

where $w = Q_z'/Q_z$ is the third component of $R(p_x'/f, p_y'/f, 1)^T$.

Note this transformation is independent of the three-dimensional structure of the environment, since there is no parallax change. If all of the polygons have the same orientation and have been combined into an image, then the image can be transformed as a unit. Otherwise, the polygons must be rotated individually.

Rotations about an axis in the plane of projection is simpler. For example, for a rotation of ω about the y axis is:

$$p_x/f = ((p_x'/f)\cos \omega + \sin \omega)/D$$

$$p_y/f = (p_y'/f)/D \quad \text{Eq. (18)}$$

where $$D = -(p_x'/f)\sin \omega + \cos \omega$$

This can be done fairly fast if done column-wise: to find all of the pixels in the rotated projection for a column defined by fixed $p_x'$, first calculate D and $p_x$ using the above formulas. Then, for each pixel in that column, calculate $p_y$, which is a (non-integer) multiple of $p_y'$, and interpolate the value from the original projection at $(p_x, p_y)$. This is analogous to Chen's scanline coherence.

We claim:

1. A method for forming a panoramic image from multiple fisheye images comprising the steps of:

capturing a plurality of fisheye images from a keypoint, and seaming said plurality of fisheye images together to form at least a portion of a spherical view.

2. The method according to claim 1 wherein said plurality of images includes, a first image, a second image, a third image and a fourth image captured from the keypoint.

3. The method according to claim 2 wherein said first direction of said first image is straight upward from said keypoint, and the respective second, third and fourth directions of said second, third and fourth images are 0°, 120° and 240° about a horizon but tilted at least about 19.5 degrees below horizontal.

4. The method according to claim 2 wherein said plurality of images also includes a fifth fisheye image taken in a fifth direction and each of said images has a view angle of at least about 127°.

5. The method according to claim 4 wherein said first direction of said first image is straight upward from said keypoint, said fifth direction of said fifth image is straight downward and respective second, third and fourth directions of said second, third and fourth images are 0°, 120° and 240° about a horizontal, respectively.

6. The method according to claim 4 wherein said first direction of said first image is straight upward from said keypoint, said sixth direction of said sixth image is straight downward and respective second, third, fourth and fifth directions of said second, third, fourth, and fifth images are 0°, 90°, 180° and 270° about a horizontal, respectively.

7. The method according to claim 2 wherein said plurality of images includes a fifth fisheye image taken in a fifth direction and a sixth fisheye image taken in a sixth direction, each of said images having a view angle of at least about 109.5°.

8. The method according to claim 1 wherein each of said images has a view angle greater than 141 degrees.

9. The method of claim 1, wherein the keypoint is a viewer-selected viewpoint.

10. A method for forming a full panorama image from multiple fisheye images comprising the steps of:
    capturing a plurality of fisheye images each comprising a k-projection,
    creating a database of images together with their k-projections, their k-points, predetermined key orientations, and domains, and
    utilizing the information in said database to seam said plurality of fisheye images together to form a full image spherical view, said seaming step including seaming overlapping portions of at least two of said plurality of fisheye images.

11. A system for forming a full panorama image from multiple fisheye images comprising the steps of:
    a camera for capturing a plurality of fisheye images from a keypoint, and
    a computer program for seaming said plurality of fisheye images together to form a full image spherical view, said seaming step including seaming overlapping portions of at least two of said plurality of fisheye images.

12. The system of claim 10, wherein the keypoint is a viewer-selected viewpoint.

13. A method for forming a panoramic image from multiple fisheye images comprising the steps of:
    capturing a plurality of fisheye images from a keypoint, and
    seaming said plurality of fisheye images together to form at least a portion of a spherical view, said seaming step including seaming overlapping portions of at least two of said plurality of fisheye images.

14. A method of forming a panoramic image from multiple fisheye images, comprising:
    receiving a viewpoint request from a user;
    determining a nearest keypoint to the viewpoint, wherein the keypoint is associated with keypoint data stored in a storage medium, the keypoint data including at compressed polygons of imagery from at least one fisheye image, wherein the compressed polygons of imagery are visible at the keypoint;
    responsive to the keypoint being a predetermined distance from the viewpoint,
    reading the keypoint data from the storage medium;
    decompressing the compressed polygons;
    seaming the decompressed polygons together into an image that is visible at the keypoint; and
    displaying the image to the user.

15. A method of forming a panoramic image from multiple fisheye images, comprising:
    receiving a viewpoint request;
    determining a nearest keypoint to the viewpoint, wherein the keypoint is associated with keypoint data stored in a storage medium, the keypoint data including compressed polygons of imagery from at least one fisheye image, wherein the compressed polygons of imagery are visible at the keypoint;
    responsive to the keypoint being a predetermined distance from the viewpoint, generating polygons of imagery that are visible at the viewpoint;
    compressing the polygons; and
    storing the compressed polygons as keypoint data.

16. A computer-readable medium having stored thereon instructions which, when executed by a processor in a system for forming a panoramic image from multiple fisheye images, causes the system to perform the operations of:
    capturing a plurality of fisheye images from a keypoint; and
    seaming the plurality of fisheye images together to form at least a portion of a spherical view.

17. The computer-readable medium of claim 16, wherein the keypoint is a viewer-selected viewpoint.

* * * * *

UNITED STATES PATENT AND TRADEMARK OFFICE
CERTIFICATE OF CORRECTION

PATENT NO.    : 6,683,608 B2
DATED         : January 27, 2004
INVENTOR(S)   : Stuart J. Golin, Scott Gilbert and Thomas Baker It is certified that error appears in the above-identified patent and that said Letters Patent is hereby corrected as shown below:

<u>Title page,</u>
Item [56], References Cited, U.S. PATENT DOCUMENTS, add:
-- 6,256,061 A   07/2001         Martin et al. ………. 348/222.1 --

<u>Column 13,</u>
Line 19, replace "k-points" with -- keypoints --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,683,608 B2
DATED : January 27, 2004
INVENTOR(S) : Stuart J. Golin, Scott Gilbert and Thomas Baker It is certified that error appears in the above-identified patent and that said Letters Patent is hereby corrected as shown below:

<u>Title page,</u>
Item [56], References Cited, U.S. PATENT DOCUMENTS, add:
-- 5,657,073 A   08/1997        Henley .......348/38 --

Signed and Sealed this

Fifth Day of April, 2005

JON W. DUDAS
*Director of the United States Patent and Trademark Office*